United States Patent [19]
Brown

[11] 3,925,650
[45] Dec. 9, 1975

[54] METHOD AND APPARATUS FOR DETECTING A REPETITIVE SIGNAL IN A NOISY BACKGROUND

[75] Inventor: Buck C. Brown, Rockville, Md.

[73] Assignee: Presearch Incorporated, Silver Spring, Md.

[22] Filed: Feb. 15, 1974

[21] Appl. No.: 443,117

[52] U.S. Cl. ............ 235/164; 235/150.53; 235/156; 235/181; 343/100 CL
[51] Int. Cl.² .......................................... G06F 7/38
[58] Field of Search . 235/181, 183, 150.51, 150.53, 235/164, 156; 343/100 CL

[56] References Cited
UNITED STATES PATENTS

| | | | |
|---|---|---|---|
| 3,446,949 | 5/1969 | Trimble | 235/152 |
| 3,538,317 | 11/1970 | Fukuda | 235/150.51 |
| 3,705,297 | 5/1972 | John | 235/150.53 |
| 3,763,361 | 10/1973 | Smart | 235/183 |
| 3,780,279 | 12/1973 | Stover | 235/150.51 |

*Primary Examiner*—Felix D. Gruber
*Attorney, Agent, or Firm*—Cushman, Darby & Cushman

[57] ABSTRACT

A method and apparatus is disclosed for detecting and enhancing a repetitive pulse echo signal in a noisy background. Periodic acoustic pulses are generated and reflected from a target object. The return signal, having a preselected period, is converted into a plurality of binary signals, one for each of a plurality of time increments in each repetition interval. The magnitude of the signal in each time increment is subtracted from the magnitude of the signal in the succeeding time increment. The resulting difference signals are sequentially stored in a first register until the return signal interval has been completed. The difference signals for a plurality of such return signal intervals are stored in a plurality of shift registers. The magnitude of the difference signals in each of the corresponding discrete time increments of a plurality of repetition intervals are added together and an average signal strength is derived for each of the discrete time increments in the repetitive signal. In addition, the magnitude of the difference signal in a discrete time increment for each of the repetition intervals is multiplied by the magnitude of the signal in the corresponding time increment in the next succeeding repetition interval. These product signals are then summed to provide an autocorrelated signal. This multiplication continues until the signals in each of the corresponding discrete time increments in each of the repetition intervals has been multiplied by the signal in the corresponding increment in the next succeeding repetition interval. The sum and auto correlated signals are then added together and displayed at an output to provide a double independent correlation of the input repetitive pulse echo signal.

8 Claims, 3 Drawing Figures

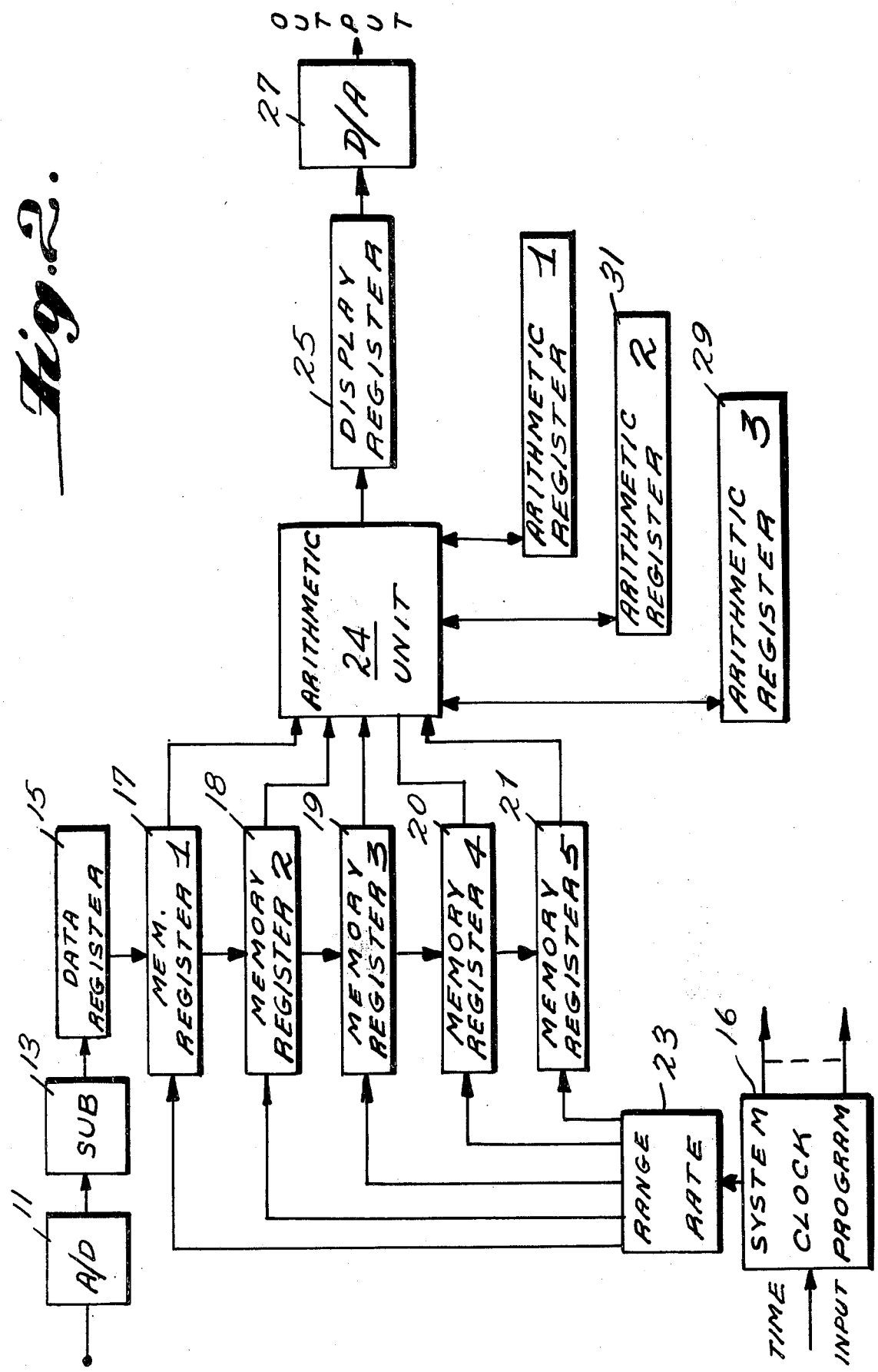

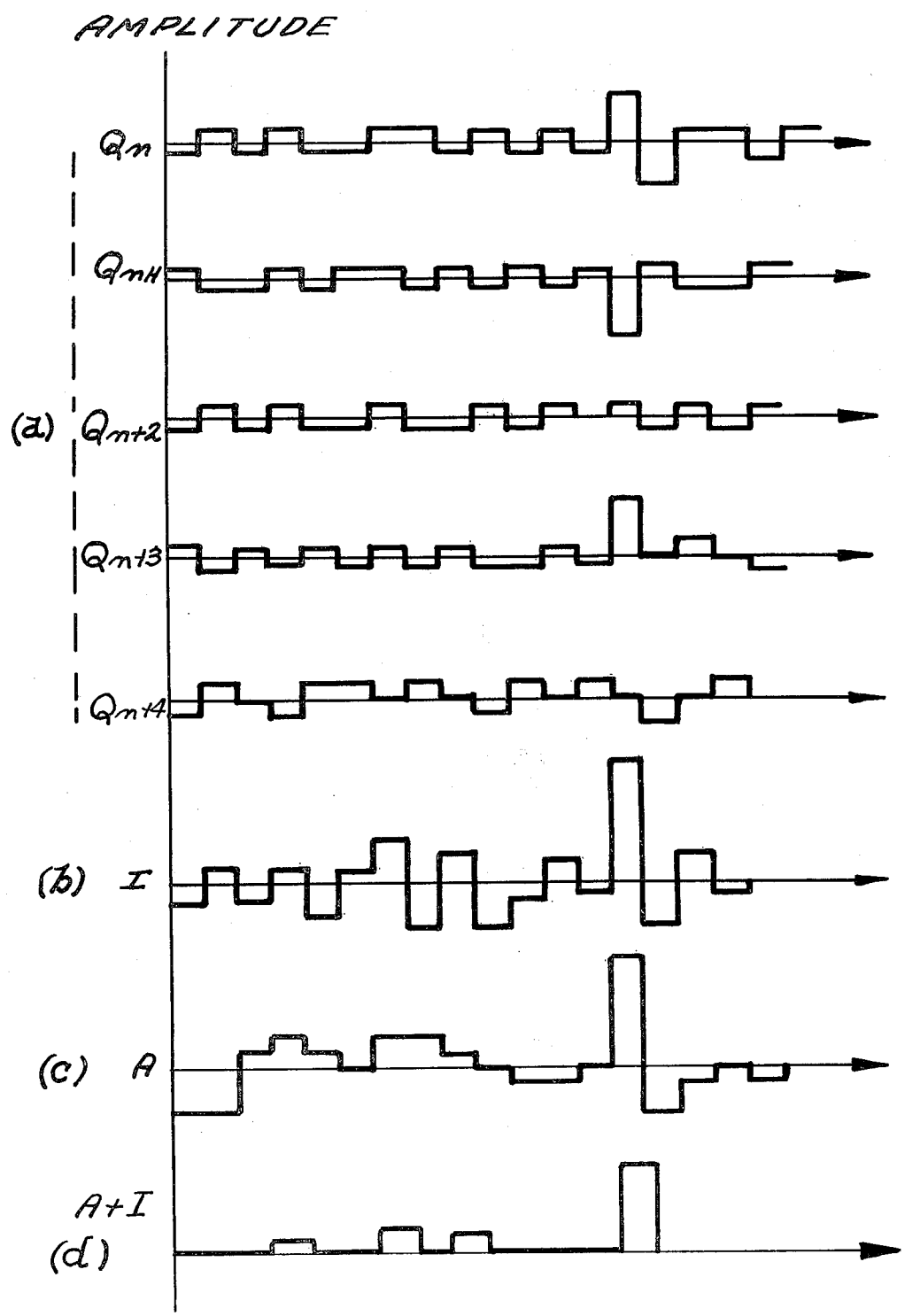

METHOD AND APPARATUS FOR DETECTING A REPETITIVE SIGNAL IN A NOISY BACKGROUND

BACKGROUND OF THE INVENTION

This invention relates to a signal processor for detecting and enhancing repetitive information signals in a noisy background. More particularly, this invention relates to a pulse echo sonar system which employs correlation techniques for detecting and enhancing pulse echoes.

In sonar systems, acoustical pulses or pings typically having a duration of a fraction of a second are periodically generated. The period between pings may vary but typically is in the range of many seconds. When the sonar pulses impinge upon an object, such as a vessel, a return pulse or echo pulse is generated which is detected by a suitable transducer. The return pulse is immersed in a noisy background wherein the background noise is both random and non-random in nature. Thus, in an ocean environment both random and systematic noise components contribute to the composite background noise level. Systematic noise components can be attributed to, among other things, acoustic reverberation, the ocean waves, ship movements, temperature gradients, etc. Much of this noise is difficult to predict at any point in time and few devices have been successful in reliably and accurately extracting information pulses from such a noise background.

In the past, a number of attempts have been made to enhance repetitive information signals or pulses so that they can be unambiguously detected in a background of noise. Thus, U.S. Pat. No. 3,531,802 issued to Buck C. Brown et al and assigned to the common assignee herewith, relates to a system for dividing a sonar pulse period or repetition interval into discrete time intervals. The average signal level for each complete sonar pulse period is derived and is subtracted from the specific magnitude of the return signal in each discrete time interval. Because the total energy in time intervals containing the repetitive signal plus noise is almost always greater than the energy in time intervals containing noise only, the typical presence of a repetitive signal during each repetition interval is detected by accumulating the residual signal over a plurality of sonar pulse periods.

Later a more accurate system was developed for determining the background noise level in each of the discrete time intervals as set forth in U.S. Pat. No. 3,693,100, issued to Buck C. Brown et al and assigned to the common assignee herewith. This improved signal processing system is operated by dividing the sonar pulse period into a plurality of discrete time intervals. The background noise is determined by averaging the signal level in the time intervals immediately preceding and succeeding the time interval being examined. The average background noise level is then subtracted from the magnitude of the signal in the time interval being examined. The resultant signals for each discrete time interval is accumulated over a plurality of sonar pulse periods to provide a cumulatively enhanced signal corresponding to the return ping in the sonar system.

Other attempts have been made to provide reliable detecting of pulse echoes such as disclosed in U.S. Pat. No. 3,764,963 wherein a plurality of pulses are generated in each sonar pulse period in order to decrease the effect of noise on the detection of pulse echoes. Each of the aforementioned systems, while improving the accuracy and reliability with which signals are detected have proven to be less than adequate for providing an accurate and reliable signal detection means. A need therefore exists for a method and apparatus for rapidly and accurately detecting the return echo pulse in a sonar system by overcoming the adverse effects of both random and non-random noise.

It therefore is an object of this invention to provide a signal processing system for detecting information in a noisy background.

It is another object of this invention to provide a signal processing system which is capable of detecting and enhancing a pulse in a noisy background.

SHORT STATEMENT OF THE INVENTION

Accordingly, applicant has provided an information signal detection system which includes means for generating a plurality of binary signals, one for each of a plurality of time increments in each repetition interval with the binary signals having values corresponding to the amplitude of the input signal at each time increment. The magnitude of the signal in each time interval or time increment is subtracted from the magnitude of the signal in the succeeding time increment to thereby reduce the non-random noise background. The resulting difference signals in each time increment are sequentially stored in a shift register. At the end of the repetition period, the magnitudes stored in the shift register are transferred and stored in a memory register. In the next succeeding pulse repetition period the input signal is converted to a plurality of binary signals with the values of the signals in each of the time increments being subtracted from the values of the signals in each of the succeeding time increments. These resultant signals are then stored in the shift register. At the completion of the second repetition period, the signals stored in the memory register are shifted into a second memory register and the signals stored in the shift register are shifted into the first memory register. This process is repeated for a plurality of pulse repetition periods.

The difference signals for a preselected time increment stored in the shift registers are coupled in parallel to an arithmetic unit which adds each of the signals. The sum signals are then averaged over the number of pulse periods examined to arrive at an average difference signal for each of the discrete time increments in the pulse reptition period. In addition, the magnitude of the signal in the preselected time increment in the first repetition period is multiplied by the magnitude of the signal in the corresponding time increment in the next succeeding repetition period. The magnitude of the signal in the corresponding time increment in the next succeeding time interval is multiplied by the magnitude of the signal in the same time increment in the pulse repetition period which next succeeds it and so on. These product signals are then summed and averaged over the number of intervals examined to arrive at an autocorrelated signal. The autocorrelated signal is then added to the averaged sum signal to provide a double independent correlation of the input sonar signal.

BRIEF DESCRIPTION OF THE DRAWINGS

Other objects, features and advantages of this invention will become more fully apparent from the following detailed description of the preferred embodiment, appended claims and the accompanying drawings in which:

FIG. 2 is a block diagram of the double independent correlator of the present invention; and FIG. 3 is a series of graphical representations of the waveforms generated by the double independent correlator of FIG. 2.

DETAILED DESCRIPTION OF THE PREFERRED EMBODIMENT

Figure 1:
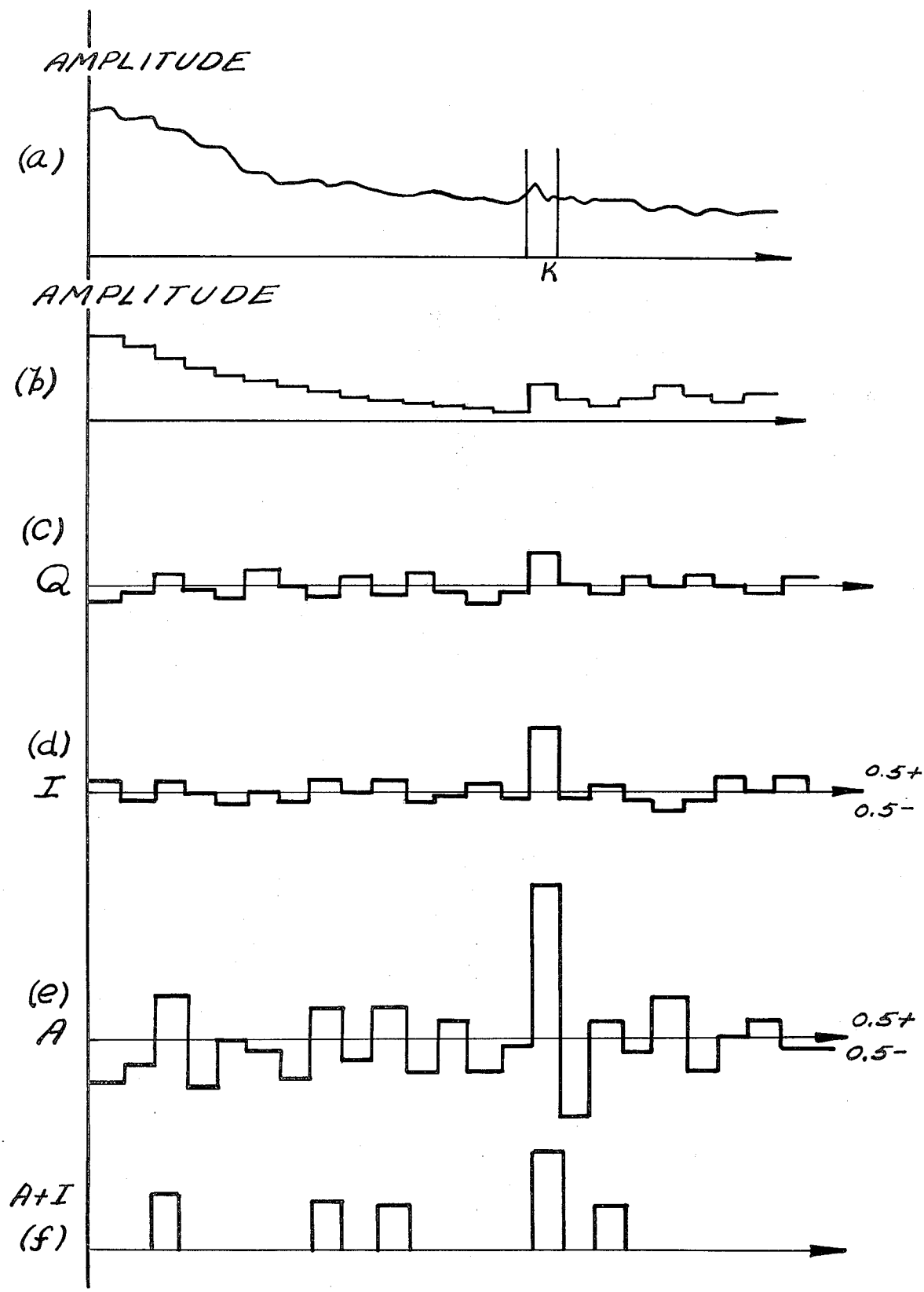
FIG. 1 is a series of graphical representations of the waveforms associated with the signal processing system of the present invention.

The present invention relates to a correlating apparatus for detecting a repetitive signal in a noisy background. As will be discussed more fully hereinbelow, the received input signal which has a predetermined repetition interval is converted into a plurality of binary signals, one for each of a plurality of time increments in each repetition interval. The period of the repetition interval and the duration of the time intervals or increments depend upon the type of signal being received. For example, if a sonar pulse is being detected, the repetition interval may typically be 40 seconds and the duration of each time interval or increment is approximately equal to the duration of the sonar pulse plus a correction factor for target elongation. Thus, the time increment may typically be 0.5 seconds.

In order to reduce the effect of background noise on the received signal, the signal is normalized by subtracting from the magnitude of the signal in each time increment, the magnitude of the signal in the time increment which immediately precedes it. Thus, assume that the repetition interval $P_n$ is considered a sequence of smaller time increments $D_1, ... D_L$. Then the repetition interval may be expressed as follows:

$$P_n = D_1, D_2, D_3, ... D_L. \quad (1)$$

where $P_n$ is the nth interval and $D_L$ is the Lth increment. After subtracting the magnitude of the signal in each time increment from the magnitude of the signal in the next succeeding time increment, a new expression is derived which represents the difference signals for each time interval $D_2, D_3, ... D_L$ as follows:

$$Q = D_2-D_1, D_3-D_2, D_4-D_3, ..., D_L-D_{L-1} \quad (2)$$

This expression can be simplified to $$Q = q_1, q_2, q_3, ..., q_k, ..., q_L \quad (3)$$

wherein $D_n-D_{n-1} = q_{n-1}$ and wherein $q_L$ is the difference symbol in the Lth time increment.

If a second subscript of the symbol q is provided which designates a particular repetition interval, the nth repetition interval can be described as follows:

$$Q_n = q_{1,n}, q_{2,n}, q_{3,n}, ..., q_{L,n} \quad (4)$$

One operation that can be performed on the incoming signals is to sum the difference signal $Q_n$ in the corresponding time increments of a plurality of repetition intervals. Since a noise signal after normalization will have an equal probability of being positive or negative, the sum of a plurality of time increments having only a noise signal will approach zero in magnitude. On the other hand, a time increment having an information signal will have a probability of greater than 0.5 of being positive. Accordingly, the sum of a plurality of time increments having a pulse or information signal will tend to accumlate to a value substantially greater than zero, thereby permitting the time increment which contains the information signal to be easily detected. The sum or resultant signal I of a plurality of time increments normalized over the number of repetition intervals considered is set forth as follows:

$$I = \frac{1}{r+1}(q_{k,n} + q_{k,n+1} + q_{k,n+2} + ..., q_{k,n+r}) \quad (5)$$

where the subscript $k$ represents the particular time increment being considered and r+1 represents the number of repetition intervals considered.

For an independent correlation, a form of autocorrelation can be performed in accordance with the following equation:

$$A = \frac{1}{r} [(q_{k,n} \times q_{k,n+1}) + (q_{k,n+1} \times q_{k,n+2}) + ...+ (q_{k,n+(n-1)} \times q_{k,n+r})] \quad (6)$$

Thus, the magnitude of the normalized difference signal in the kth time increment of the first repetition interval is multiplied by the normalized difference signal in the kth time increments of the second repetition interval. To this product is added the product of the normalized difference signal in the kth time increments of the second and third repetition intervals, and so on, until the sum of the products of the corresponding time increment for each repetition interval is formed.

Each of the aforementioned correlations are relatively independent of one another since the leverage of the first correlation is derived by a summation process while the leverage of the second correlation is derived by a multiplication process. If the resultant of either correlation, i.e., I or A, is positive, the probability of the existence of the information signal in the time interval considered is greater than 0.5. On the other hand, if the resultant of either correlation is negative, the existence of the desired signal is less than 0.5. Since the probability of either resultant polarity of either correlation being positive or negative is 0.5 if the signal is noise, the probability of both correlations being positive is 0.25. Thus, the double correlation produces a noise threshold which eliminates approximately 75 percent of the noise intervals from being considered in detecting the information pulse. Thus, as a final step, each correlation is combined to provide a final correlation. The final correlation may be performed in several ways, such as, by a multiplication or summation process. As will be discussed hereinbelow, in the preferred embodiment the final correlation is performed by a summation process. The sum is defined by the following equation:

$$R = A + I \quad (7)$$

where if either A or I is negative, then R is set equal to O.

Refer now to FIGS. 1 and 2 which respectively illustrate the waveforms associated with present invention and a block diagram of the correlator. In the case of a sonar system, a sonar pulse is generated and transmitted in a desired direction. The return echo pulse is then received by an approporiate transducer. A complete sonar return interval is illustrated graphically in FIG. 1a. As illustrated, the received signal includes a sonar echo pulse positioned in the kth time interval or increment. This pulse may have an amplitude which is less than certain portions of the received signal because of the non-random nature of the noise signal received. Because of this, it is desirable to normalize the received signal in order to eliminate or reduce the noise background and particularly that portion of the noise background which is due to systematic noise. Accordingly, the received signal is coupled to an analog-to-digital converter 11 of conventional design. The analog to digital converter 11 quantizes the signal of FIG. 1a, as graphically illustrated in FIG. 1b. Thus, the signal illustrated in FIG. 1b has a discrete or value for each of a plurality of equal time increments over the entire pulse repetition period. The output of the analog-to-digital converter is coupled to a subtracting circuit 13. The subtracting circuit subtracts the magnitude of the signal in the first discrete time increment from the magnitude of the signal in the second time increment to thereby provide a first difference signal $q_1$. This difference signal is then coupled to the input stage of the shift register 15. Next, the signal corresponding to the magnitude of the signal in the second time increment is subtracted from the value of the signal in the third time increment to provide a second signal $q_2$ which corresponds to the difference in the signal levels of the second and third time intervals. This process repeats itself until an entire pulse repetition period has been received by the double independent correlator of FIG. 2. The resulting difference signals $q_n$ are derived and are sequentially shifted into data register 15 in a manner which is well known in the art. The resulting signal stored in the sections of the data register 15 are illustrated in FIG. 1c. It can be seen from examining FIG. 1c that much of the background noise and in particular the non-random background noise is eliminated by the subtracting process.

After the data register has been filled, a readout pulse is generated by the system clock source 16, thereby reading out the data stored in register 15 in parallel to a first memory register 17. A second sonar pulse is then generated and a second pulse repetition period begins during which the return signal is again quantized by the analog-to-digital converter 11, appropriately subtracted by subtracting circuit 13 and sequantially stored in data register 15. When data register 15 is again filled, a pulse is generated by the system clock 16 which reads in parallel the contents of memory register 17 into memory register 18 and reads in parallel the information stored in data register 15 into memory register 17. This process repeats itself with succeeding sonar pulse periods until all five memory registers 17, 18, 19, 20 and 21 are filled with data.

Refer now to FIG. 3 of the drawings which illustrates the difference signals $Q_n-Q_{n+4}$ for five repetition intervals which are stored in the memory registers 17–21. The kth time increment which contains the information or pulse signal typically has the difference signal with the greatest positive value. However, because of the noise characteristics of the background, the information pulse may not always be detectable in a given repetition interval such as in the $Q_{n+2}$ and $Q_{n+4}$ intervals. Accordingly, correlation techniques must be performed on the stored difference signals in order to detect and enhance the information signal.

Thus, the data stored in the first or output stage of each memory register 17–21 is read in parallel into arithmetic unit 24. Arithmetic unit 24 may be of any conventional design but in the preferred embodiment is a Fairchild 3800, 8 bit parallel bit accumulator. The manner in which the arithmetic unit 24 is controlled to compute the sum and products of the various signal levels coupled thereto is conventional technology well known to those of ordinary skill in the art and accordingly the detailed arrangement of the circuitry of the arithmetic unit for performing the computations required in the present invention is not set forth in detail so that the present invention can be described with both clarity and conciseness. Each of the signal level values coupled to the arithmetic unit from the output stage of the memory registers 17–21 are added together and divided by five in accordance with equation 5 in order to arrive at a value for I for the first time increment of the repetition signal. This procedure is repeated for each of the succeeding time increments in the repetition signal until each of the individual time intervals or increments over a series of five pulse echo signals has been summed and averaged. The resulting output discrete summation signals from the arithmetic unit are stored in an auxiliary storage unit 29.

The summation signal I is illustrated in FIG. 1d. As illustrated the computed sum signals over a plurality of pulse repetition increments tend to vary about the zero signal level. If the resultant signal I is positive, the probability of the existence of the desired return pulse signal is greater than one-half. On the other hand, if the resultant signal I is negative, the probability of the existence of the desired signal is less than one-half. Also in referring to the Figure, the time interval $k$ in which the information signal is positioned will tend to have a greater positive magnitude than the surrounding time increments since the signal amplitude for that time increment in each of the repetition pulse intervals has the probability of being greater than the return signals in the other time intervals. Thus, the summation signal level in the kth time increment will tend to have a much greater magnitude than the signal levels in the surrounding time increments.

In order to achieve a second correlation, an additional correlation is derived which is a form of autocorrelation. Thus, in accordance with equation 6, the magnitude of the signal in the output stage of the memory register 21 is multiplied by the signal in the output stage of the memory register 20, the signal in the output stage of memory register 20 is multiplied by the value of the signal in the output stage of memory register 19, and so on. Thus, the corresponding time increments in succeeding repetition intervals are multiplied by each other to provide a series of autocorrelated signals wherein the correlation delay period is equal to a pulse repetition period. The resultant products are summed and divided by the number of products taken in order to arrive at an averaged or normalized product signal A. The product signal A, as illustrated in FIG. 1e, is stored in an auxiliary storage register 31. This process is repeated for each time increment in the repetition period with the resulting product being stored in register 31.

Referring to the A waveforms of FIG. 1e and FIG. 3c, it can be seen that the variation of the product signal in each time increment varies more drastically from the zero level than did the summation signal I. This is due to the fact that the leverage of the process for deriving the I signal is due to addition, whereas the leverage for deriving the A signal is due to multiplication. Since the aforementioned correlations are essentially independent and since the probability of either resultant polarity is 0.5 if the input information is pure noise, the probability of both correlations being positive is 0.5 × 0.5 or 0.25. Thus, the final step taken by the arithmetic unit 24 is to sum the values A and I for each time increment wherein if either the value A or I for a given time increment is negative, the resultant output R is zero. This output signal is illustrated in FIGS. 1(*f*) and 3(*d*) and is coupled to the display register 25. The output signal is then converted to an analog signal by a conventional digital-to-analog circuit 27.

The independent correlation of the present invention from a practical standpoint produces a noise threshold which eliminates approximately 75 percent of the noise intervals from consideration in determining the particular time interval in which a return pulse exists. Depending upon the original signal-to-noise ratio of the source, a very small percentage of the desired signal intervals will also be eliminated. However, since the magnitude of the desired signal intervals are normally greater than the magnitude of the noise intervals, the increment in which the return pulse is positioned will become quickly obvious.

A running double correlation is provided in keeping with the present invention, by continuously subtracting, summing and multiplying the received input signal. Thus, the output in the display register 25 is continuously updated as the repetitive pulse echo signals are received. Since there is an initial period of time after the sonar pulse is transmitted in which no return information is of practical interest, this period is advantageously utilized to accomplish the steps of shifting data from shift register 15 to the memory register 17, from register 17 to register 18 and so on. In addition, each of the computational steps can take place during this time interval.

If the object being detected in moving with respect to the source of the sonar pulses, the repetitious pulse echo signal will shift with respect to the repetition interval. With the return pulse echo or information signal shifting from one pulse return interval to the next, the information or pulse echo signals fall within a number of different time intervals or increments over a plurality of repetition intervals. Thus, accumulation or correlation of the signal with respect to a single pulse increment is impossible. Accordingly, provision is made for varying the order in which the memory registers 17–21 are read out. Range rate circuit 23 may include, for example, a variable delay line so that rather than having each of the memory registers 17 – 21 read out or advanced simultaneously, each of the memory registers will be read out at an increasingly delayed time. Thus, for example, if the object being detected is moving toward the sonar pulse transducer, with each succeeding repetition interval, the return ping will move timewise closer to the start of the pulse repetition interval. Accordingly, the difference signals of the first received pulse repetition interval which is stored in memory register 21 will have the return ping at a time position which is further from the output stage thereof than the return pulse stored in memory register 20. The return pulse in memory register 20 will be positioned timewise further from the output stage thereof than the return pulse stored in memory register 19, and so on. Accordingly, in order to effect simultaneous readout of the signals stored in the time increment in which the return pulse ping is positioned, the clock pulse from the system clock 16 must be coupled to the shift registers 17 – 21 with a decreasing delay, i.e., the readout pulse coupled to register 21 would have no time delay, the readout pulse coupled to shift register 20 would have a first time delay determined by the rate at which the object is approaching the sonar transducer, the readout pulse coupled to memory register 19 will have a greater delay, and so on. The time delay in which the stepping pulses are coupled to each of the memory registers is determined by sweeping the range rate circuit 23 through a range of delays until the delay which provides the largest output signal in a particular time increment is detected.

While this invention has been described in connection with a preferred embodiment, it should be understood that there may be other embodiments which fall within the spirit and scope of the present invention as defined by the appended claims.

What is claimed is:

1. An apparatus for detecting repetitive and similar input information signals in a noisy background wherein the information signals exist for only a short time relative to a complete repetitive interval and wherein the noise background exists for the complete repetition interval, comprising
   means for generating a plurality of digital signals, one for each of a plurality of time increments in each repetition interval, said digital signals having a value corresponding to the amplitude of the input signal at each time increment,
   means for subtracting the value of the digital signal in each time increment from the value of the digital signal in the next succeeding time interval to derive a plurality of difference signals,
   means for sequentially storing each of said difference signals,
   means for sequentially storing the difference signals of a plurality of said repetition intervals, and
   means for summing the values of each of the difference signals in a predetermined time increment of each of said plurality of repetition intervals, wherein the difference signals in corresponding time intervals of said plurality of repetition intervals are summed to form a cumulative difference signal for the predetermined time increment over the plurality of repetition intervals.

2. The apparatus of claim 1 wherein said summing means additionally sums the values of a difference signal in each of said repetition intervals wherein the difference signals summed in each repetition interval is in the correspondingly adjacent time increment of the time increment in the next succeeding repetition interval.

3. A apparatus for detecting repetitive and similar input information signals in a noisy background wherein the information signals exist for only a short time relative to the complete repetition interval and wherein the noise background exists for the complete repetition interval, comprising
   an analog to digital converter, said converter generating a plurality of digital signals, one for each of a plurality of time increments in each repetition interval, said digital signals having a value corresponding to the amplitude of the input signal at each time increment,
   a subtractor circuit connected to the output of said analog to digital converter for subtracting the value of the digital signal in each time increment from the value of the digital signal in a next succeeding time increment to derive a plurality of difference signals,
   a data register connected to the output of said subtractor for sequentially storing each of said difference signals, a plurality of memory registers serially connected to one another and to the output of said data register for storing the difference signals of a plurality of said repetition intervals, and an arithmetic circuit connected to said memory registers for summing the values of each of the difference signals in a predetermined time increment of each of said plurality of repetition intervals.

4. The apparatus of claim 3 further comprising a variable delay line having a plurality of outputs connected to the shift inputs of said plurality of memory registers and means for applying a clock signal to said variable delay line, said variable delay line providing delayed clock pulse outputs to each of said memory registers in accordance with the rate of movement of said information signal from increment to increment within each repetition interval, said arithmetic summing circuit thereby summing the difference signals in correspondingly adjacent time increments relative to the time increment in a next succeeding repetition interval.

5. The apparatus of claim 3 wherein said arithmetic circuit further multiplies the value of the difference signal in a preselected time increment by the value of the difference signal in a corresponding time increment in the next succeeding repetition interval to derive a plurality of product signals, the multiplication occurring over a plurality of repetition intervals, and said arithmetic circuit further sums said product signals to derive an autocorrelated signal for said selected time increment.

6. An apparatus for detecting repetitive and similar input information signals in a noisy background wherein the information signals exist for only a short time relative to a complete repetition interval and wherein the noise background exists for the complete repetion interval, comprising means for generating a plurality of digital signals, one for each of a plurality of time increments in each repetition interval, said digital signals having a value corresponding to the amplitude of the input signal at each time increment, means for subtracting the value of the digital signal in each time increment from the value of the digital signal in the next succeeding time increment to derive a plurality of difference signals, means for sequentially storing each of said difference signals, means for storing the difference signals of a plurality of said repetition intervals, means for summing the values of each of the difference signals in a predetermined time increment of each of said plurality of repetition intervals, for multiplying the value of a difference signal in a preselected time increment by the value of the difference signal in a corresponding time increment in the next succeeding repetition interval to derive a plurality of product signals, said multiplication occurring over a plurality of repetition intervals, and for summing said product signals to derive an autocorrelated signal for said selected time increment.

7. The apparatus of claim 6 wherein said means for summing, multiplying and summing said product signals further sums the autocorrelated signals and the summed difference signals for each of a plurality of time increments.

8. The apparatus of claim 6 wherein said means for summing, multiplying and summing said product signals normalizes said correlated signals and said summed difference signals over the number of repetition intervals considered.

* * * * *